Patented Oct. 10, 1922.

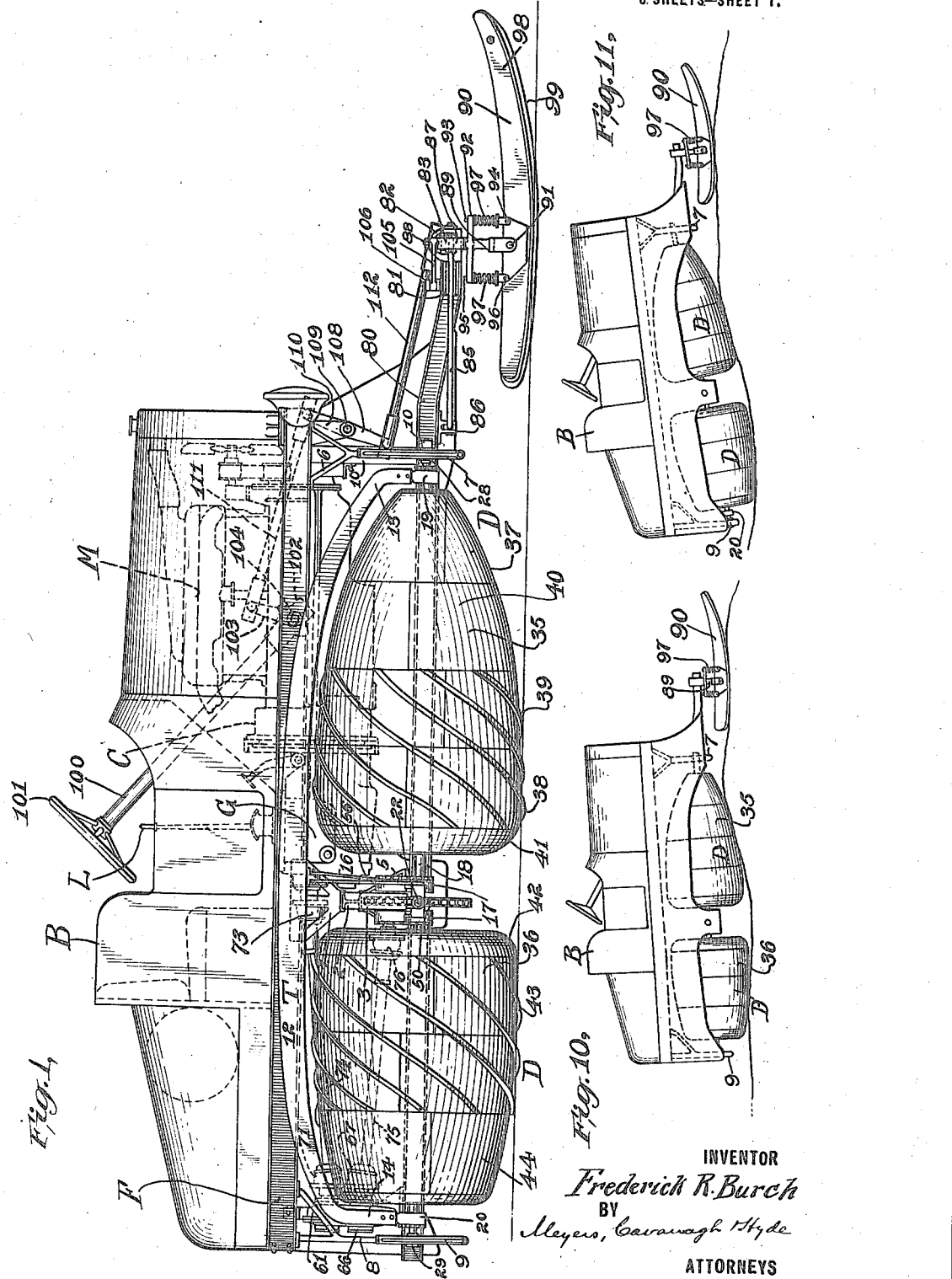

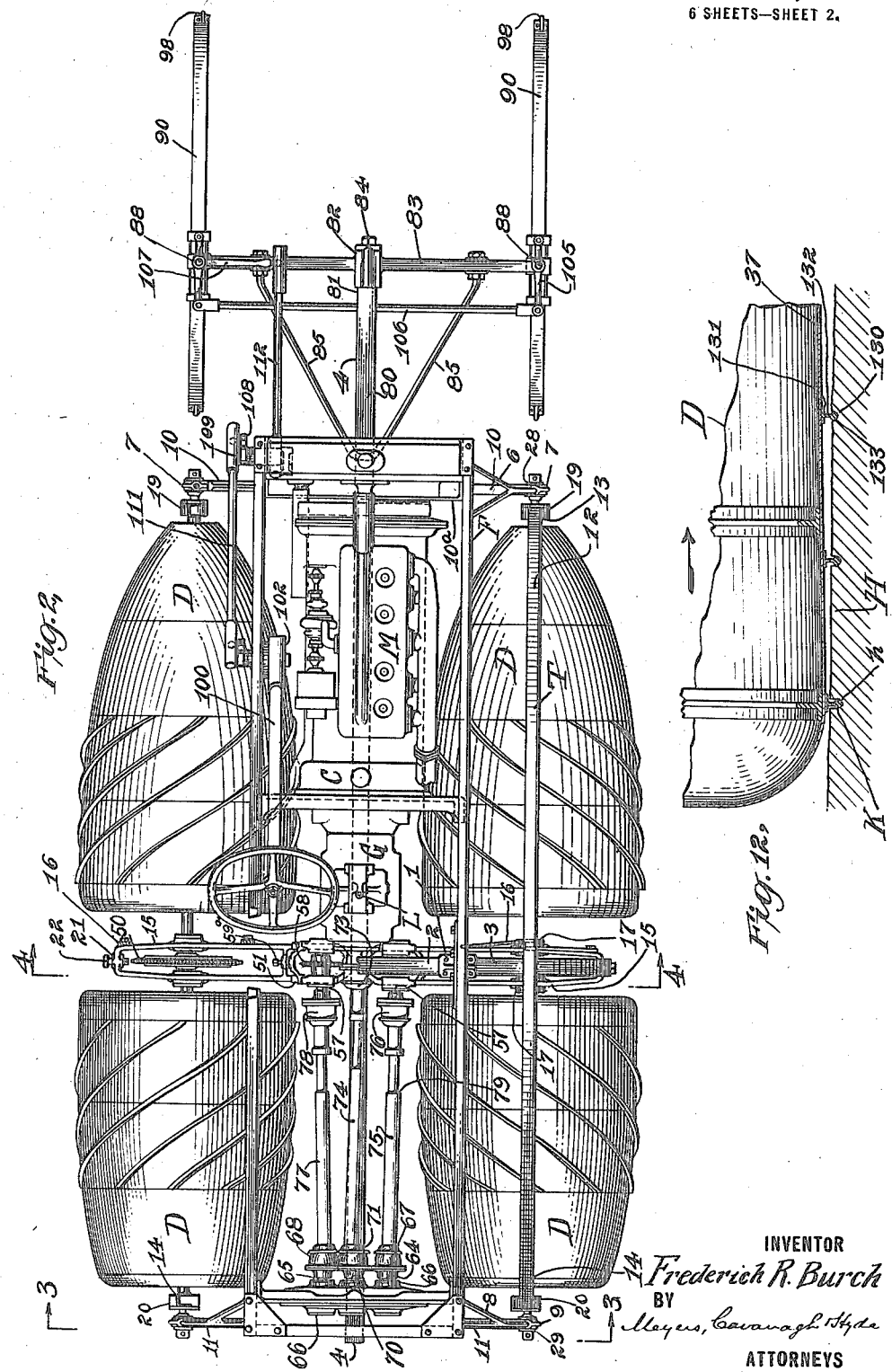

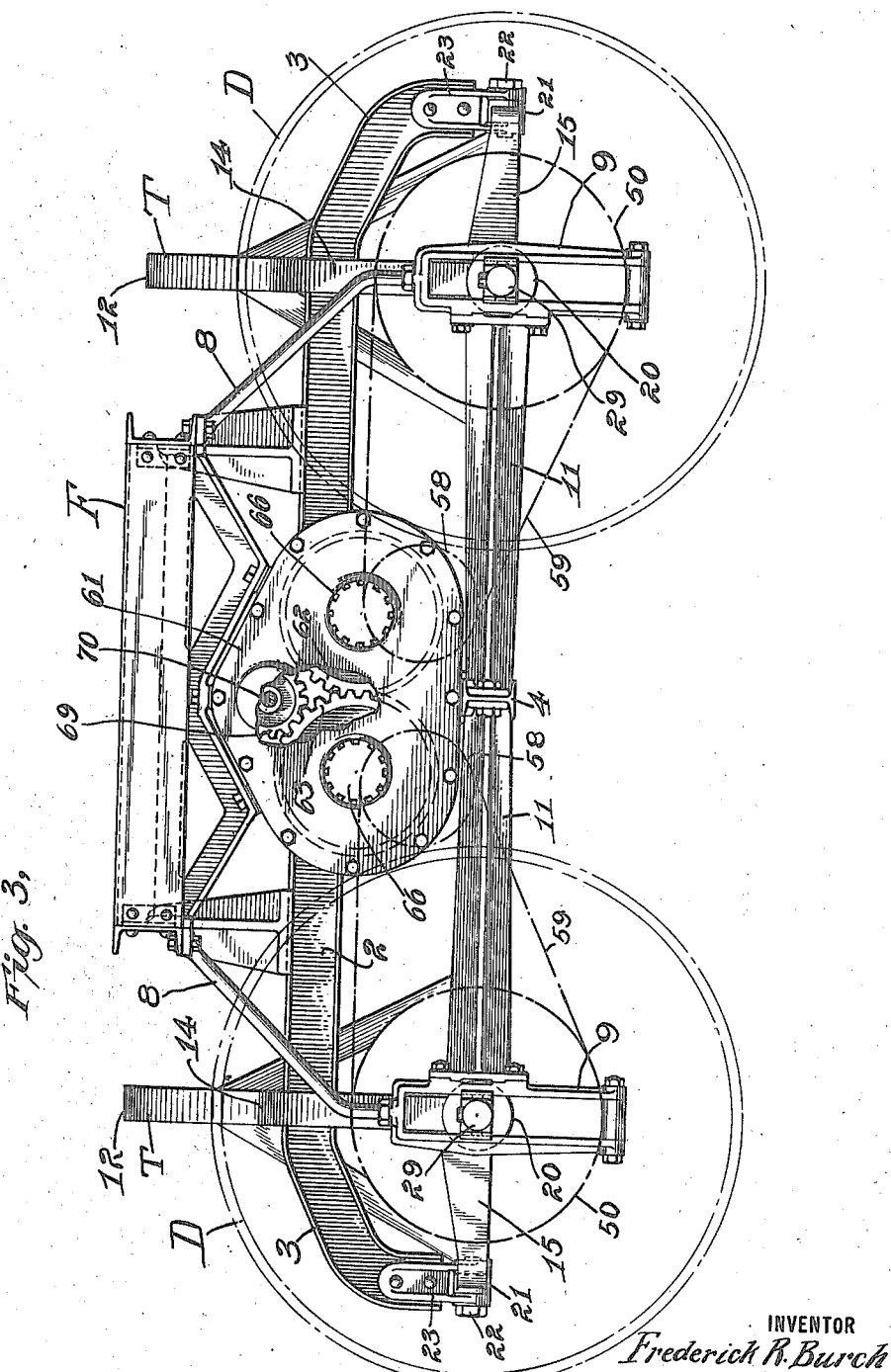

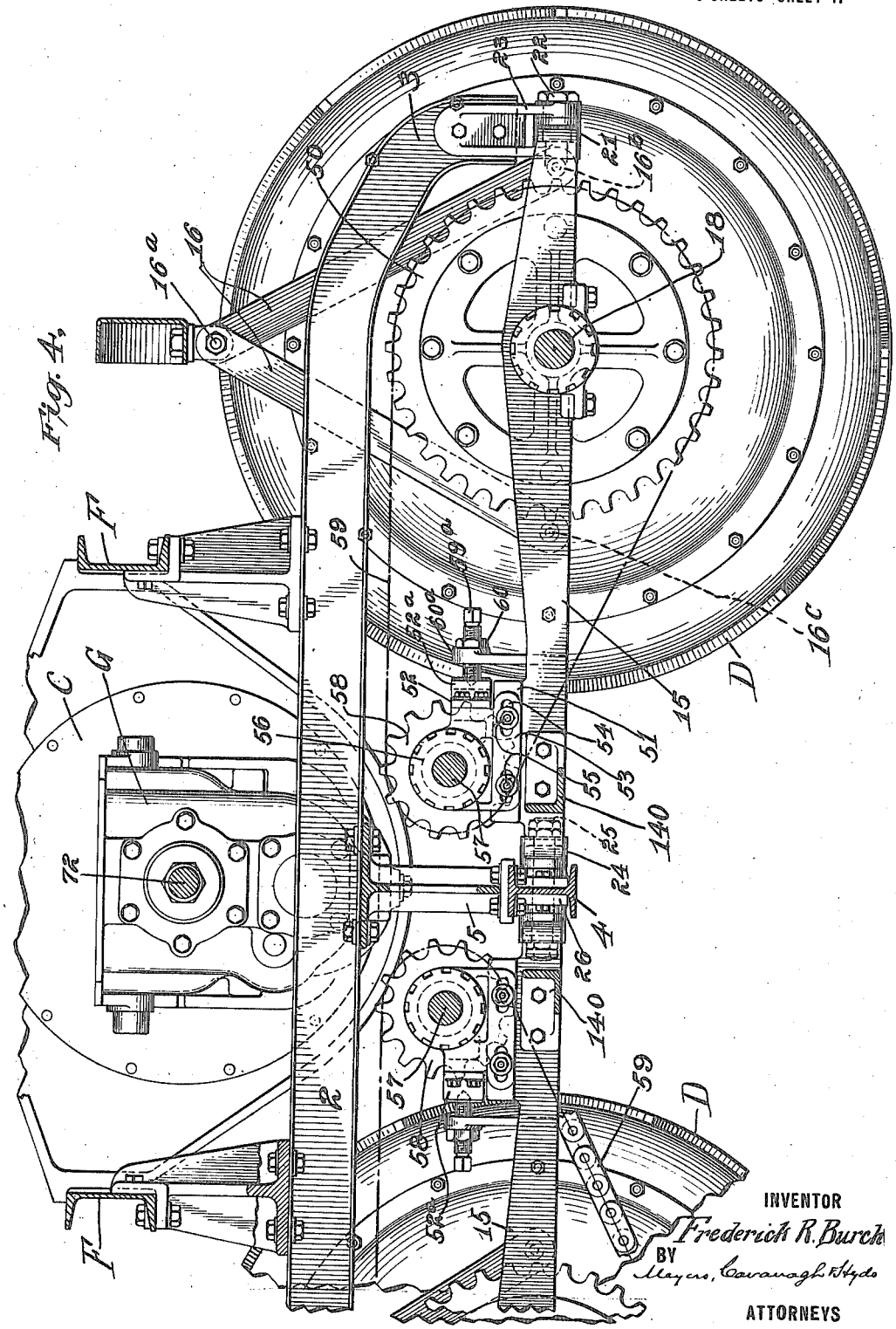

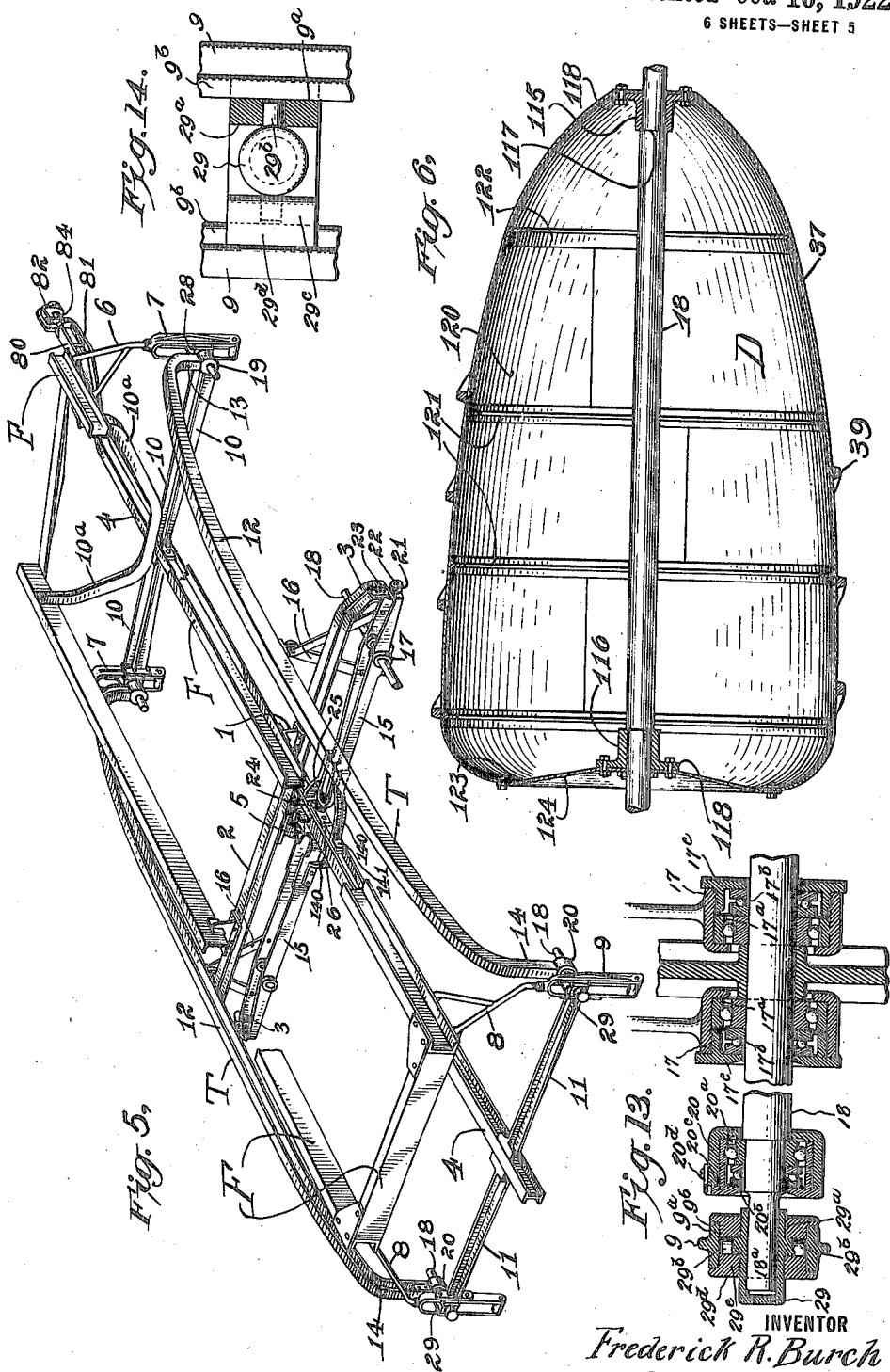

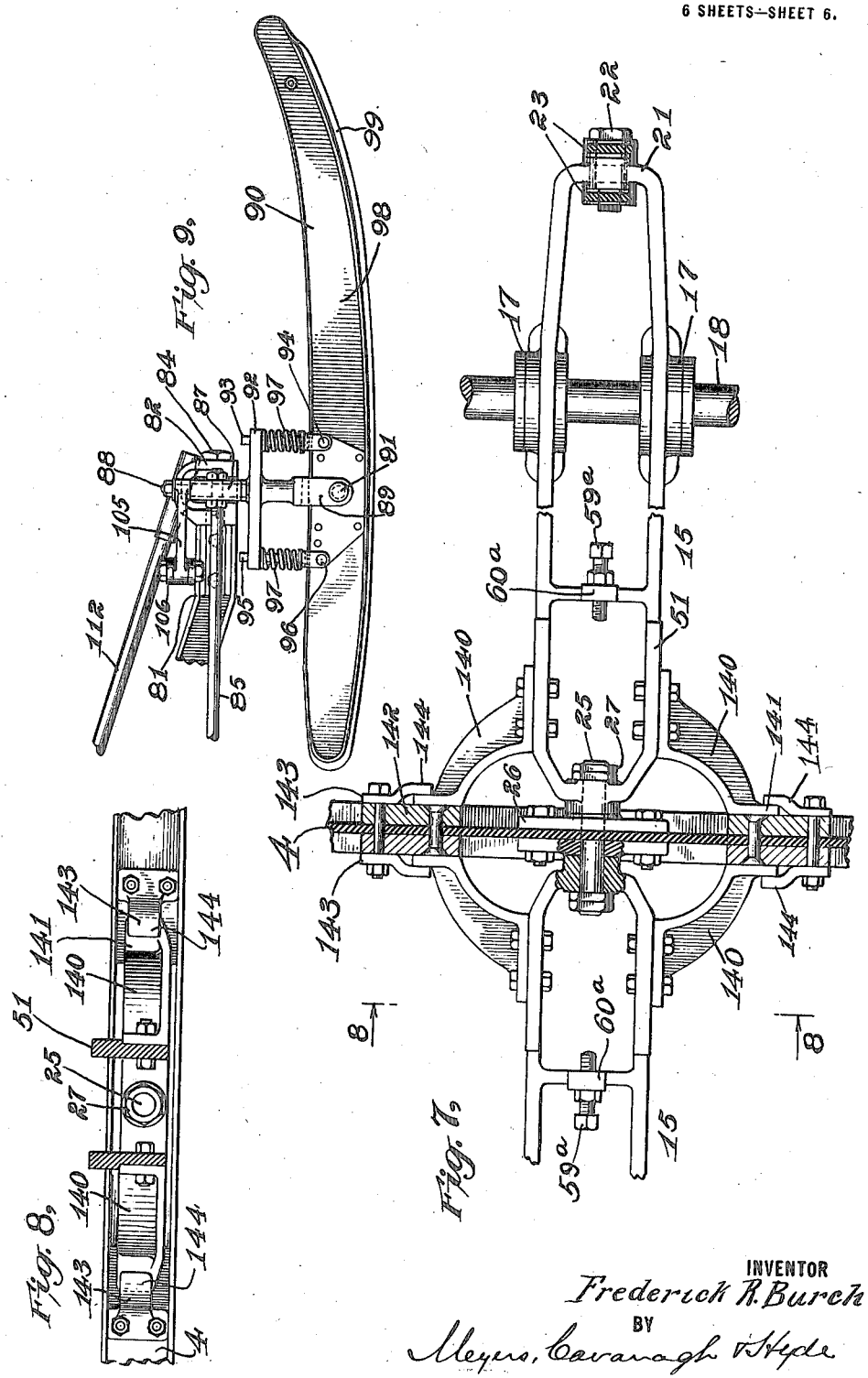

1,431,440

UNITED STATES PATENT OFFICE.

FREDERICK R. BURCH, OF SEATTLE, WASHINGTON, ASSIGNOR TO ARMSTEAD SNOW MOTORS, INCORPORATED, OF NEW YORK, N. Y., A CORPORATION OF DELAWARE.

SNOW MOTOR VEHICLE.

Application filed November 27, 1920. Serial No. 426,788.

*To all whom it may concern:*

Be it known that I, FREDERICK R. BURCH, a citizen of the United States, and resident of Seattle, in the county of King and State of Washington, have invented certain new and useful Improvements in Snow Motor Vehicles, of which the following is a specification.

My invention relates to snow motor vehicles; that is, motor vehicles designed to run on snow and ice.

The general object of the invention is to provide a motor vehicle of this class having all the essential features for meeting the peculiar and varying conditions encountered in this kind of service. A successful snow motor vehicle must travel over deep, fresh snow falls, compacted snow or ice, ice crusts overlying soft snow, and slush, and must also accommodate itself to surface irregularities. For the sake of brevity, the material traveled over will be referred to hereinafter simply as "snow," "snow surface" or "snow body," except when further qualified to explain different characteristics of the machine.

In northern latitudes, where the snow fall is heavy for several months of the year, transportation by horse power and by wheeled motor vehicles is always difficult and often impossible; and it is desired to provide a motor vehicle capable of breaking out roads or even going across country through newly fallen deep snow, and hauling trailers at the same time when necessary or desirable. This is probably the severest service required, but the vehicle should also be able to cope with all other conditions of snow surface, to go backward as well as forward, to make considerable speed under favorable conditions and exert increased tractive effort with correspondingly reduced speed under unfavorable conditions.

After study of the problem, experiment, and practical tests and experience with vehicles under the various conditions encountered throughout northern winters, I have devised and successfully demonstrated in operation a vehicle which meets the conditions imposed. So far as I am aware, I am the first to produce a really practical motor sled incorporating all the features which are found to be essential in practice.

The complete vehicle embodies a number of essential features, as explained hereafter, but from one point of view, the primary requirement is adequate support upon and tractive contact with all kinds of snow surfaces. To provide for this, a basic feature of my invention consists in one or more tractor units arranged to present a large supporting surface to soft snow and provided with snow gripping and propelling members adequate to give proper traction in soft snow with moderate frictional resistance and at the same time to give a reduced supporting area upon hard snow or ice, also with proper tractive effect upon such surfaces.

More particularly described, the tractors consist of revoluble drums of relatively large diameter and of adequate length having surfaces which are curved in the plane of their axes for a great part of their length to provide for the most advantageous snow contact under varying conditions of snow texture and surface conformation. These drums are provided with relatively shallow helical projections which have an angular reaction upon the snow surface when the drums are revolved and so drive the vehicle. The vertical face area of these projections is sufficient to give proper driving impulse in soft snow, but not sufficient to create undue frictional resistance. Their peripheral surfaces serve as the principal support of the tractors upon, and provide adequate driving contact with, hard snow or ice. The surface curvature of the tractor drums in the axial plane is also such that the tractors will ride over soft snow and hard lumps satisfactorily, either forward or backward. Preferably also, one end of each drum is smooth, that is, free from helical driving ribs for a certain distance from one end (the smaller) toward the other (larger) end, to exert a channeling and smoothing effect upon soft snow in advance of driving contact of the ribs with the channelled snow surface as the tractor advances with the smooth surface foremost. Preferably also, each tractor unit is interrupted at a point between its ends, that is, it consists of two drums in axial alinement, rather than a single continuous drum, and the surface of the drums in the planes of their axes is defined by a continuous curve, extending substantially from the front end of the front drum to the rear end of the rear drum; and preferably also this curve has a decreasing radius toward the ends, so that the forward and rearward portions of the snow-engaging surfaces have an increasing upward curvature relative to the snow-surface; and the longitudinal curvature of portions of the drum surfaces may be so slight as to be substantially straight; these slightly curved or substantially curved areas being usually included in the portions of the drum surfaces which are provided with driving ribs. This surface curvature in connection with the pivotal arrangement of the tractor units mentioned below, enables the drums to properly ride over and conform to all kinds of snow-bodies and surface irregularities, as explained in the following detail description. The drums are also preferably arranged so that the principal smooth segment of the front drum is directed forward, and the smooth portion of the rear drum is directed backward. Usually two such tractor units are provided in parallel relation.

In connection with such tractor elements I provide a suitable main frame supporting a body structure, a suitable motor, and power transmission devices; and additional framing and supporting structures to connect the tractors properly with the main frame. I have found that an essential requirement in connecting the tractors with the main frame, or as otherwise considered, in supporting the main frame upon the tractors, is that each tractor unit shall have a considerable oscillating or pivotal movement in its longitudinal, vertical plane in relation to the main frame, to permit each tractor unit to conform properly to irregularities of the snow surface. This requirement is provided for in the arrangement of the frame structure. The invention further provides suitable driving connections from the motor or transmission mechanism carried by the main frame to the tractor units, and provides suitable flexible elements in such driving connections to permit the oscillating movement of the tractor units and for other reasons.

It is found desirable to pivotally connect the tractor units to the main frame at an intermediate point of the length of each tractor unit, and also to provide driving connections to the tractor shafts at points substantially coincident with their pivot-connections. The invention includes mutually adopted structures which provide the desired pivot and drive connections in a simple and desirable form.

The invention also provides suitable steering means, consisting in a preferred embodiment in forwardly arranged dirigible runners, and provides for suitably connecting these runners with the main frame so that the weight of the main frame is distributed between the tractive units and the runners in an advantageous way, and so that the individual runners, and also the steering structure as a whole, have a certain flexibility of movement.

Since the vehicle frequently runs in deep snow, in which the tractor drums sink quite deeply, the frame, driving and steering connections and other features are designed to provide an unobstructed space longitudinally through the machine between the drums, extending up a substantial distance above the level of the bottoms of the drum surfaces; and this unobstructed clearance space may be substantially as high as the average horizontal plane of the drum shafts. This permits the vehicle to pass freely over a relatively high ridge formed between the channels pressed by the drums in deep, soft snow, or other obstructions straddled by the drums in the progress of the vehicle.

I have found that springs comparable to the chassis springs of ordinary motor vehicles, such as have been proposed for motor sleds in some cases, are usually, if not always, unnecessary in connection with other features of my invention, for the reason that the flexible mounting of the tractor units and guiding runners carries the vehicle very smoothly over snow surfaces of all sorts, without any bumps or shocks which are objectionable or injurious either to the vehicle or to the goods or passengers carried. I, therefore, dispense with any springs having a principal cushioning or supporting function, and correspondingly simplify the frame structure.

Various strains and thrusts are imposed on the frame and on moving parts, incident to movement over various surfaces, and driving reactions. The proper resistance to, and distribution of, these stresses have been carefully provided for, in the arrangement of main and tractor frame members, driving and pivot connections, and guides for the movable tractor frames, as explained sufficiently hereafter.

To meet the various conditions briefly suggested above, and to incorporate the structural features mentioned, as well as others referred to later, is an exceedingly complex inventive problem. In its solution practically all the principal parts of the machine have had to be mutually adapted to each other. These features of mutual adaptation will be sufficiently understood from the following detail description of a representative form of the invention.

The invention comprises numerous other features which are best described in connection with a detailed description of the accompanying drawing, which shows one exemplifying embodiment of the invention. After considering this it will be understood that numerous subordinate parts or sub-combinations of elements of the invention have utility in themselves, apart from other parts or sub-combinations, and that such parts and sub-combinations may be varied greatly within the principles of the invention.

In the drawings:

Figure 1 is a side elevation of a snow sled embodying the invention;

Figure 2 is a top plan with some parts broken away;

Figure 3 is a rear end elevation with a fragment of the rear gear casing broken away;

Figure 4 is an enlarged transverse vertical section at 4—4, Figure 2;

Figure 5 is a perspective view, somewhat diagrammatic, of the frame structure;

Figure 6 is an enlarged longitudinal section of a tractor drum;

Figure 7 is a detail, partly in section, of one of the pivotal tractor carriers and part of another one, and the adjacent part of the main frame;

Figure 8 is a sectional detail in the plane 8—8, Figure 7;

Figure 9 is an enlarged side elevation of the front end of the machine, showing the steering runners;

Figures 10 and 11 are small diagrammatic side elevations of the vehicle, showing the accommodation of the tractors and runners to different snow surface conformations, and Figure 12 is an enlarged fragmentary sectional detail of one of the tractor drums.

Figure 13 is an enlarged sectional detail of one tractor shaft, with parts broken away, showing mainly the shaft, bearings and lateral guide means.

Figure 14 is an enlarged fragmentary rear end elevation, partly in section, of one of the vertical shaft-guides.

The general organization of the machine is best explained by first considering Figure 5, in connection with Figures 1, 2, 3, 4 and 9. A frame stucture F, of generally rectangular plan, carries the vehicle body B. This frame F is analogous to the chassis frame of an ordinary motor vehicle and serves conveniently to support the motor M, change-speed gearing contained in the gear box G, and a clutch contained in the intermediate clutch housing C, and these parts may conveniently be, as shown, of so-called unit power-plant construction, as now employed in the majority of motor vehicles, or any other suitable arrangement of the motor, clutch and change-speed gearing may be made. The main frame also carries suitable control devices, of which gear-shift lever L is a sufficient example. Transversely arranged below the chassis frame F and rigidly connected to it by brackets 1 is a beam 2 having downwardly curved ends 3. Below beam 2 and substantially in the longitudinal center of the machine is a beam 4 which extends substantially throughout the length of the vehicle. A strut 5 rigidly connects the center of beam 2 with an intermediate part of beam 4. Beams 2 and 4 may be of any suitable structural section but are conveniently of I-section as shown. Near the front end of the frame F each of its side members is provided with a bracket 6 and each of these brackets carries a vertical guide 7 for the front end of one of the tractor frames. Near the rear end of the frame F each of its side members is provided with a bracket 8 and each of these brackets carries a vertical guide 9 for the rear end of one of the tractor frames. Transverse frame members 10 connect guides 7 to longitudinal beam 4 and similar frame members 11 connect guides 9 to beam 4 near its rear end. Frame members 10 and 11 constitute, in effect, continuous cross braces for the lower front and rear portions of the rigid frame structure. Near the front end of frame F diagonal braces 10$^a$ connect side members of frame F with beam 4 and usually this last connection is substantially at the point of connection between cross members 10 and beam 4.

At each side of the rigid frame is a tractor frame T. Each of these comprises a longitudinal beam or truss 12, generally of a curved or arched form, as shown, with downwardly bent front and rear ends 13 and 14, respectively, and a transverse member or yoke 15, and these members are connected by braces 16. Preferably these braces are arranged as best shown in Figures 4 and 5 at downwardly divergent angle to each other, so that they meet at 16$^a$ where they are connected by means of a suitable bracket to truss 12 and the lower ends of the braces are connected at the widely separated points 16$^b$ and 16$^c$ to the side member of yoke 6. This arrangement gives a triangular bracing of the tractor frame adjacent to its drive mechanism and renders the frame very strong and stiff, both vertically and laterally. Each of the yokes 15 may be of substantially rectangular form (in plan) and its side members are provided with bearings 17 through which passes a shaft 18 which is the tractor drum carrying and driving shaft of the tractor unit. The ends of truss 12 are provided with bearings 19 and 20, through which shaft 18 also passes. The outer end of each of the yokes 15 is provided with a trunnion bearing 21, through which passes a trunnion 22, conveniently in the form of a bolt carried by a clevis 23 fixed to the adjacent end 1 of beam 2. The inner end of each of yokes 15 has a trunnion bearing 24 (Figures 4, 8 and 9) through which passes a trunnion 25, conveniently in the form of a bolt which extends through a suitable socket formed in beam 4 or provided in plates 26 bolted to the beam. The trunnion bolt is secured by nuts 27. Bolt 25 thus serves as a trunnion for the inner ends of both of yokes 15, and the heads, consisting of nuts 27, resist lateral displacement of the yokes. Each of the tractor yokes 15 is preferably provided with two arms 140, one bolted to each side member of the yoke. These arms terminate in flanges 141, whose inner faces bear against plates 142, secured to the web of beam 4. Clips 143 are also secured to the beam and these clips have ends 144 overlying the projecting ends of flanges 141. In the oscillating movement of the yokes, flanges 141 move between plates 142 and clips 144 and the inner ends of the yokes are thus additionally braced and guided: and disalinement of the yokes and of their trunnions is resisted. Located on each end of each shaft 18 is a guide sleeve 29 (see especially Figures 13 and 14), considerable clearance being provided between the shaft-end and the outer end of the sleeve. Each sleeve has parallel, vertical, flat faces 29ª, and from each of these faces extends a trunnion 29ᵇ. The trunnions fit in bearing holes in slide blocks 29ᶜ, and the blocks have flat vertical faces arranged to slide against inner faces 9ª of the vertical side members of the corresponding vertical guides 7 or 9. The blocks also have flanges 29ᵈ engaging the front and rear edges 9ᵇ of the guides. As the shaft ends move up and down in the pivotal movements of the tractor frames, slide blocks 29ᶜ move vertically up and down on the vertical guide members; trunnions 29ᵇ rotate slightly in their sockets, and the shaft ends move somewhat in and out in sleeves 29; and thus the necessary vertical oscillation is freely permitted, and lateral movement of the ends of the tractor frames is effectively resisted.

The construction described is such that each tractor frame, comprising the truss 12, yoke 15 and braces 16, is an operative unit which may oscillate in the vertical plane of its shaft 18 to the extent permitted by the length of guides 7 and 9, the center of oscillation being the axis of trunnions 22 and 25. In this movement the guide sleeves 29 move up and down in guides 7 and 9, and the guides effectively brace the tractor frame and the parts that it carries, against lateral movement. The tractor frame is at the same time effectively braced against any rotative movement about its shaft axis by the widely separated points of support afforded by the trunnions.

The tractor drums D are mounted on drum shafts 18. The drum structure on each shaft may be considered an operative unit, but preferably this structure is separated somewhere near mid length of the shaft, and there are, in a preferred embodiment as shown, two tractor drums on each of the shafts 18, and usually the forward and rear drums on each shaft are of similar structure and shape in many respects, but preferably they also differ in certain respects and the forward and rear drums will therefore be described with considerable particularity.

The forward drum 35 of each of the tractor units is in the form of a convex cone or approximate conoid, cut off only a short distance from the tip so that its surface 37 curves gradually inward from a point 38 near the rear end to the front end of the drum. Helical flanges or ribs 39 are secured on the rear portion of the drum surface and there is a relatively large number of these ribs arranged at a rather steep pitch-angle so that several of the ribs are always in contact with the snow surface. The ribs 39 are of moderate depth in a radial direction from the shaft so that their front and rear faces in contact with snow at any time, even when the tractors are sunk deep in soft snow, are not of sufficient area to impose an undue frictional load on the motor, and at the same time in packed snow, where the drums do not sink into the snow surface to any great extent, the ribs bite into it sufficiently to afford all necessary driving contact. The preferred form of these driving ribs will be more particularly described hereafter. The ribs, so arranged, occupy a zone about the drum periphery, extending from a point near its rear end, forward for a considerable distance. The length of this zone of driving ribs may be varied to suit different conditions. The forward portion 40 of the drum, extending from the front end of the rib zone to the front end of the drum is finished smooth, and has only a sliding contact with the snow surfaces without propulsive effect. As the drum is driven forward by the engagement of the ribs with the snow body, the smooth conical forward end of the drum presses or irons down loose snow or rides up easily and smoothly over harder snow and lumps. In the case of soft snow the forward portion of the drum thus forms a channel for the rearward ribbed or driving portion, and the ribs in effect engage with a trough formed in the snow body by the drum and affording ample driving contact for the vehicle and for a trailer load. The surface of the drum from a point near the rear end of the ribbed surface is curved more sharply inward toward the shaft, providing a relatively, more steeply upwardly inclined contact surface 41, presented to the snow body when the tractor drum moves backward.

The rear drum 36 is in general similar to the front drum just described. It has a relatively sharply rounded front edge portion 42, similar to the rounded rear edge portion 41 of the front drum. It is provided with helical ribs 43 arranged substantially as in the case of the front drum.

Between the ribbed portion and the rear end of drum 36 is a smooth portion 44 similar to the smooth portion 37 of drum 35, but in the present embodiment of the invention, somewhat shorter. The peripheral surface of drum 36 is in the form of a convex cone or conoid, cut off at a greater distance from its point than in the case of drum 35. In a preferred construction the total length of drum 36 is less than that of drum 35 and this difference in length is mainly taken care of in the shortening of the smooth rear portion 44. A gradual upward curvature of the lower smooth surface of the drum provides for pressing down soft snow and riding over lumps when the vehicle is backed, as in the case of drum 35, when the vehicle is driven forward; but since backing is relatively infrequent the inward curvature of the rear part of drum 36 need not be carried to the same extent, in some cases, as in the case of drum 35. By considering the combined action of the two drums as the vehicle goes forward or backward it will be understood that the moderate rounded curvature of the adjacent ends of the two drums is sufficient to smooth down or ride over any irregularities that may remain in or any loose snow or lumps that may fall into the path made by one drum after its passage and before the rounded end 41 or 42 of the other drum reaches the same point in the tractor path.

Considering the two tractors on each shaft as an operative unit, it will be noted that the surface curvature from the forward end of the front tractor to the rear end of the rear tractor is substantially continuous, except for the interruption at the space between the drums, and at this point the tangent-angle of curvature is increased upwardly, relatively sharply at the rear end of the front tractor and the front end of the rear tractor. The general continuous curvature from one end to the other of the two tractor drums constituting a tractor unit may be a uniform curve or arc, or the form of the curve may preferably in some cases be varied so that near the front end of the front drum 35 and the rear end of the rear drum 36 the radius of the curve is shortened. As shown clearly in Figure 1, this makes the lower surface of the outer end of each of the drums curve upward more sharply than the inward portion of each drum, and gives in fact in the vertical plane of the shaft axis the approximate form of a runner with upwardly curved ends; so that if the drums were pushed forward without rotation they would act substantially as runners and slide up easily over the soft snow or obstructions, in either direction of movement. Approximately the same effect in riding over the snow surfaces is obtained when the machine is driven forward by the rotation of the drums, a different linear portion of the drum surface acting at each moment as the principal snow engaging or runner surface of the drum. Describing the contour of the tractor drums in another way, their surfaces in planes of the axis are defined by a continuous, substantially curved, line extending substantially from the front end of one drum to the rear end of the other. The curvature of certain portions of the surfaces, usually near the larger ends of the drums, may be decreased to such an extent that, as in the present case, certain portions of the drum surfaces are practically straight or cylindrical and these approximately straight or cylindrical portions are usually included in the areas of the drums which are provided with the driving ribs.

The tractor drums are of sufficiently great diameter and length to provide adequate support for the vehicle, even in very soft and deep snow. While, of course, I do not limit myself to definite dimensions, the drawings indicate that the drums are of very considerable size in relation to the general dimensions of the vehicle, and I have found that they should be made much larger than has been proposed in certain previous structures of this class. The depth of the driving ribs is small in relation to the diameter of the drums. By this arrangement adequate driving contact is provided without appreciable tendency to cut deeply into soft snow bodies, or to waste power in the attempt to rotate deep driving flanges having a large area of snow contact, since the area of the drums is sufficient under all circumstances to support the drums and the vehicle to prevent the driving ribs from cutting or digging away the snow in the channel formed by the drums, sufficiently to cause the drums to sink into their channels to an undesirable extent, comparable, for example, to the action of wheeled tractors, whose peripheral cleats under a very heavy driving load, and on soft ground, will, in many cases simply dig a hole into which the wheels sink until the chassis structure strikes the ground. In my invention such a burrowing action is avoided by the ample support afforded by the drums.

The detail construction of the tractor drums may vary greatly, but the form shown is desirable and preferred in some cases. Figure 6 shows a typical drum in section. Suitably spaced apart on the drive shaft 18 are sleeves 115 and 116, and these may be located against shoulders 117 formed on the shaft, and the sleeves may be welded or keyed or otherwise firmly secured, to rotate with the shaft. Each sleeve is provided with a flange 118. The shell of the drum may be built up of a number of plates 120 of suitable metal, suitably welded or riveted together. Usually it is desirable to reinforce the shell, as, for example, by means of a number of hoops 121 of convenient cross section secured to the inner face of the shell. Some of these hoops may be conveniently of T-section, as shown, and others, such as the forward hoop 122, may conveniently be of L-section to accommodate more easily the angle of the shell near its smaller end. At one end, such as the large end, the shell may terminate in an aperture 123. This end of the shell may be connected to flange 118 of sleeve 116 by an end plate 124 bolted to the shell material about aperture 123 and also bolted to the flange, and this end plate may be dished inwardly as shown, to provide greater stiffness. The other end of the shell may be similarly connected to the shaft, especially in the case of the rear drums 36, where the diameter of the smaller end of the drum is quite large, or otherwise the shell material may be brought down to overlap flange 118 and directly bolted to it, as shown in Figure 6.

The form of the driving ribs may vary greatly as previously indicated. One simple cross sectional form is shown in Figure 6. Figure 12 shows another form of driving rib, preferred in some cases. In this form the ribs 130 have the general cross sectional form of a modified T-rail, comprising a base 131 secured to the outer surface of the drum, a web 132 and an enlarged head 133 of approximately circular cross section. Figure 12 shows the tractor drum resting on a hard snow surface H. The ball heads 133 of the driving ribs cut into the surface more or less, depending on the weight imposed on them at different points in the length of the drum. Where the head of the rib cuts in to any considerable extent, as at $h$, it makes a channel or kerf $k$ in the snow body wider than the web 132; consequently the driving impulse of the rib is exerted against only a portion of the bottom of the snow kerf $k$, co-extensive with the area of the contact of the lower and rearward portion of the ball head 133. Thus the frictional contact of the rib with the snow body is very much reduced with a corresponding decrease in frictional resistance and gain in speed or draw-bar pull. This construction also avoids a difficulty encountered in connection with driving ribs of substantially flat radial form, due to the fact that when such blades are arranged helically, the curvature of the blade at its base is different from the curvature at the periphery, in accordance with the well known variations in curvature of spiral planes. It has been found in practice that flat blades of this sort cannot be feasibly given the exact curvature required, the result being that the blades bear unevenly at different points in their travel, against the rearward side of the kerf formed by them, resulting in undesirable distortion or widening of the snow kerf, accompanied by undesirably great friction and resistance to rotation of the blades. The enlarged heads 133 of the blades just described cut a snow groove or kerf wider than the thickness of the blade-webs, and consequently variations in helical curvature of the blade-web are of little or no consequence, since the sides of the web ordinarily do not have any sliding contact with the snow surface.

The heads 133 of the driving ribs are not necessarily of the round cross section but may when necessary or desirable be made with relatively sharpened peripheries for example of approximately heart-shaped cross section so that the outer edges of the ribs will bite into hard ice with satisfactory driving effect.

A sprocket 50 is fixed on each tractor shaft 18 between bearings 17. Near the inner end of each yoke its side members are provided with upward extensions 51 for the connection of sprocket frames 52. Each of these frames has side members 53 provided with slots 54, and bolts 55 passing through the slots and holes in yoke extensions 51 secure the sprocket frames to the yokes adjustably toward and from sprockets 50. The sprocket frames 52 are provided with bearings 56 and in these bearings sprocket shafts 57 are mounted. On each shaft between the bearings is a small sprocket 58 connected to the corresponding large sprocket 50 by a chain 59. The adjustment of sprocket frames 52, to regulate the tightness of the chain is conveniently provided for by a set screw 59$^a$ passing through a bracket 60$^a$ carried by yoke 15 and bearing against cross member 52$^a$ of the sprocket frame. A lock nut 60 is provided for the screw 59$^a$. When the nuts of bolts 55 are loosened the sprocket frame may be moved to left or right, as viewed in Figure 4, by turning screw 59$^a$ and the adjustment thus secured may be made permanent by setting up the nuts or bolts 55. The described mounting and adjustment of the small sprockets is representative of other arrangements that may be used.

Tractor shafts 18 are rotatively supported in their frames on suitable bearings in bearing casings 17, 19 and 20, above mentioned. The radial support of the shaft may be on typical radial ball bearings 17$^a$ and 20$^a$, Figure 13, or bearings of any other suitable form. In addition, to take the end thrust of the shafts, one or more thrust bearings, such as ball thrust bearings 17$^b$—20$^b$ are usually also provided, and these may be associated with the radial bearings as shown. For example, ball thrust 20$^b$ is located against the inner ring of bearing 20$^a$ in casing 20 and the outer ring of the thrust bearing is engaged by the inwardly projecting flange of an adjusting thimble 20$^c$ screwed into the casing and secured by a locking member 20$^d$, as usual in bearings of this type. Similarly, thrust bearings 17$^b$ in casings 17 may be adjusted by thimbles 17$^c$. By suitable adjustment of the thrust bearings, the end thrust of the shaft in either direction may be taken up by two of these bearings and is so distributed between yoke 15 and the ends of longitudinal truss 12. Where only a single thrust bearing near each end of a shaft, such as bearings 20$^b$, is provided, the thrust in either direction is taken by one of these bearings and transferred to the corresponding end of longitudinal truss 12 and from it to the main frame through the yoke trunnions.

Near the rear end of the machine a gear casing 61 is secured to the main frame. Casing 61 encloses meshed gears 62 and 63, carried by shafts 64 and 65, respectively, and these shafts are mounted in bearings 66 located in the front and rear walls of the casing. The shafts extend through the front wall of the casing and are there provided with universal joints 67 and 68 respectively, the casing also enclosing a pinion 69, carried by a shaft 70, mounted in suitable bearings and extending through the front wall of the casing. The pinion 69 engages with either of the large gears (in the present instance with gear 63) and the pinion axis is set slightly to one side of the longitudinal frame center, to permit this engagement without conflict with gear 62. A universal joint 71 is mounted on the forward end of shaft 70. A shaft 72, which is the driven shaft of the change-speed gearing, extends through the rear wall of gear casing G, and is provided with a universal joint 73. This universal joint is connected with universal joint 71 of the rear drive pinion by a "propeller" shaft 74 which is arranged at a slight angle to the longitudinal axis of the vehicle to accommodate the offset position of pinion shaft 70. A propeller shaft 75 is connected to universal joint 67 of transmission gear 62 and extends forward at a moderate angle and is connected to the rear end of shaft 57 of the right hand tractor sprocket 58 by a universal joint 76. Similarly a propeller shaft 77 connects universal joint 68 of transmission gear 63 with sprocket shaft 57 of the left hand tractor unit, through a universal joint 78. When it is found necessary or desirable any or all of the propeller shafts may be provided with a slip joint, as indicated at 79, in propeller shaft 75.

The driving parts and connections described operate as follows: When the motor rotates in the usual right-hand direction, as viewed from the front, and the main clutch is engaged, with a suitable forward-drive gear combination in engagement in the gear box, the propeller shaft 74 drives pinion 69 in a left-hand direction as viewed from the rear in Figure 3. The pinion drives gear 63 in a right-hand direction and gear 62 in the opposite direction. These gears through propeller shafts 75 and 77 and the associated universal joints drive the small tractor sprockets in the same respective directions as the gears, that is, sprocket 58 of the right-hand tractor unit, as viewed in Figure 4, has a left-hand rotation and the similar sprocket at the left-hand unit has a right-hand direction. The corresponding large sprockets of the tractor units and the tractor drums 66 are thus correspondingly driven, that is, the right-hand drums have a left-hand rotation and the left-hand drums have a right-hand rotation, as viewed from the rear, and by inspection of Figure 2 it is evident that the helical driving ribs are arranged so that the vehicle is driven forward. The change-speed gearing provides a suitable number of forward drives of suitable ratios and at least one reverse drive. In addition to conveniently providing for the transmission of power from a power plant, arranged in convenient position on the main or chassis frame, to tractor units, at a point considerably forward from the rear end of the vehicle, the transmission mechanism described also affords opportunity to introduce into the drive line a number of speed reductions, and the amount of reduction as between the driven member of the change-gear box and the tractor shafts may be considerably varied to meet different conditions by suitably varying the sizes of the different gears and sprockets in the transmission line beyond the change-gear box. Explicitly, the diameter of pinion 69 in relation to that of gears 62 and 63, may be varied, and the diameter of sprockets 58 in relation to that of sprockets 50 may be varied, to determine the amount of speed reduction at each of those points; or a reduction at either point may be avoided or an increase of speed may even be provided by suitably proportioning the parts in an obvious way. Usually, on account of the preferred large diameter of the tractor drums, and the consequent high angular speed of the drum periphery in relation to the angular speed of the shaft, the provision of ample speed reduction between the engine and the tractor shafts is desirable.

After considering the driving connections, it is evident that the spacing apart of the drums of each tractor unit provides advantageously for the location of the tractor driving means in line with the pivotal axis of the tractor units.

The main lower member or beam 4 of the rigid frame structure extends forward from its point of connection with chassis frame F and is conveniently curved downward somewhat at 80 and again straightened out at 81, and is provided with a yoke or clevis 82 to receive a transverse member 83 which is the main frame member of the steering structure and may be identified, for convenience, as a steering cross-beam. The cross beam is connected to longitudinal beam 4 by a bolt 84 passing through the sides of the clevis 82 and engaging in a suitable bearing formed in the cross beam. Diagonal braces 85 are connected to the cross beam near its outer ends and are also connected to beam 4 by means of a suitable socket 86, Figure 1. The cross beam is provided at each end with a steering head or sleeve 87 and each of these provides a bearing for a steering spindle 88. The lower end of each steering spindle is formed into a yoke or clevis 89 embracing one of the steering runners 90. A bolt 91 passes through the sides of clevis 89 and through a bearing in the runner to permit the runner to oscillate in a vertical plane. Each steering spindle is also provided with a longitudinal cross piece 92. Forward of the steering spindle the runner is provided with a spring rod 93 pivoted to the runner 94 and passing through a hole in cross piece 92. Back of the steering spindle the runner is also provided with a spring rod 95 pivoted at 96 and passing through a similar hole in the cross piece. A spring 97 is mounted on each spring rod between the runner and the cross piece. Preferably the forward spring rod and spring are located nearer to the steering spindle than the rear spring device. The form of the runners may vary considerably, but in a preferred arrangement the tread surface 98 is curved throughout its length, the curvature increasing toward the front and to a smaller degree toward the rear, and being relatively moderate at a point below the steering spindle. The runner treads are preferably provided with downwardly extending flanges 99 which provide sufficient lateral bearing engagement with the snow surface to insure proper steering action. The lower edges of these flanges may be suitably sharpened to properly cut into hard snow or ice.

The described steering structure is such that on encountering irregularities in the snow surface, the front or rear end of the runner will ride over them easily and smoothly. Considering the usual direction of travel, forward, upon encountering a hummock, the upwardly curved tread of the runner gradually rides up over it, and in doing so the runner pivots in clevis 89 and forward spring 97 is compressed, serving to yieldably transfer a part of the load to the steering spindle. As the runner goes forward over the obstacle the load is gradually transferred to a point directly under the spindle, and in further movement the runner tilts in the other direction, with accompanying compression of spring 97 until the obstacle is passed. The greater distance of rear spring 97 from the steering spindle gives this spring a greater leverage effect upon the runner than that of the forward spring and, therefore, the runner is able to tilt up to ride over an obstacle with relative ease, but supports the front end of the vehicle through the runner with relatively greater firmness as the steering spindle passes beyond the obstacle. At the same time, owing to the pivotal connection of the cross beam 83 with beam 4, either runner as a whole moves up or down about the pivot center 84 in accordance with the general ground level at either side of the vehicle.

In addition to providing for easily surmounting obstacles, the convex tread of the steering runners permits them to be quite easily turned from side to side in steering, especially in soft snow, since the weight carried by the runner is borne upon a more or less restricted segment of the curved tread.

A steering column 100 carrying a hand wheel 101 is mounted in the chassis frame in the usual way. The column terminates at its lower end in a steering-gear casing 102, having a steering arm 103, as usual in motor vehicles, except that this arm is turned upward, instead of depending from its shaft 104. This arrangement of steering parts avoids interfering with the longitudinal clearance space between the tractor units, previously mentioned, by steering arms or other parts extending downward into this space, as would occur in the ordinary arrangement of such parts, and also prevents obstruction to the upward movements of the adjacent drum. Each steering spindle 88 of the runners 90 is provided with an arm 105 and these are connected by a cross-link 106. One of the spindles, in this case the left-hand spindle, is also provided with a steering arm 107, all as usual in motor vehicles. Owing to the considerable elevation of the chassis frame above the runners, a special arrangements of parts is usually necessary to properly connect steering arms 103 and 107. This arrangement comprises in this embodiment, a lever 108 fulcrumed at 109 on a bracket 110 carried by chassis frame F. A drag link 111 connects the upper end of lever 108 with steering arm 103, and another drag link 112 connects the lower end of lever 108 with the end of steering arm 107. Preferably the steering arms 103 and 107 are provided with ball ends and the upper and lower ends of lever 108 are also provided with ball ends, and these ball ends cooperate with suitable sockets in the ends of the drag links, as usual in motor vehicles. The movement of steering arm 103 is transferred by lever 108 from drag link 111 to link 112, and so to the steering runners in an obvious manner.

From the description of the tractor and runner mounting it is now apparent that the weight of the main frame of the vehicle is supported, considering the longitudinal distribution of weight, at two points, namely the axis of trunnions 22 and 25 and the center of steering cross beam 83. The greater part of the weight is borne by the tractors and a suitable, smaller portion is borne by the steering runners, sufficient to insure proper steering engagement with the snow surface. Considering the lateral distribution of the weight, it is evident that it is distributed equally to the two tractor units through the cross beam 2, yokes 15 and the tractor frame structure. Thus while each tractor unit as a whole is free to pivot about its trunnion center to accommodate itself to surface irregularities, the two sides of the main frame are supported firmly at the pivot centers of the two tractor units. Lateral tilting of the main frame and body is, therefore, controlled by the momentary positions of the two tractors and this tilting is reduced to a minimum by the flexibility of the tractors, which causes the position of the pivot center to be at all times, roughly speaking, the average of the elevation of the two ends of the unit. Pivotal connection of the front end of beam 4 with the steering cross beam readily permits the tilting of the main frame in response to the positioning of the tractor units, regardless of the position of the steering runners and conversely either of the runners may rise or fall as a whole as they encounter lumps or depressions without tilting the main frame or imparting torsional strains to it. Otherwise expressed, the support of the main frame is on a transverse axis, which is the axis of the trunnions, and a point, which is the pivot axis of the steering cross beam, constituting what is commonly termed in the motor vehicle art, a three point support.

Figures 10, and 11 show diagrammatically the accommodation of the tractor drums and of the steering runners to different conformations of snow surfaces. In these figures both drums are shown in contact with the sides of a hollow, and it is evident from these diagrams that a considerable longitudinal area of both drums will always engage with the snow surface in spite of irregularities, because of the longitudinal curvature of the drums and their pivotal mounting in the main frame. Each tractor unit tilts or rocks in passing over irregular surfaces in very much the same manner as the steering runners, whose action has been described. If, in going forward, the front tractor drum encounters a slight rise, this strikes the drum surface at a point near the ribbed portion and the front end of the tractor is tilted upward only slightly and the main contact of the rear drum shifts to a point near the rear end of its ribbed belt. Such a slight rise or obstruction corresponds practically to a moderately curved surface, such as is shown in Figures 10 and 11, with which a relatively large part of both tractor drums of a unit will engage. If the obstruction or elevation is higher, corresponding to a greater curvature of snow surface, the principal contact with the drum surfaces will shift toward the outer ends of the drums and on first encountering this obstacle the front end of the tractor unit will tilt up more sharply than in the previous case. In any case a substantial part of the under surface of each tractor drum maintains adequate supporting and driving contact with the snow surface. In this way adequate tractive contact is always maintained without either localizing pressure unduly on parts of the drum surfaces, creating undue strains or materially decreasing the driving capacity of the drums.

It is evident from the detail description of the structure that adequate provision is made to resist and adequately distribute strains, and particularly strains applied to the movable tractor units. In going forward, the forward portions of the front tractor drums frequently have angular contact with projections which tend to move the front ends of the tractor frames laterally. This is resisted by engagement of guide-sleeve, slide-blocks 29ᶜ with the vertical front guide members 7, which transfer this lateral strain to the main frame. Similarly any lateral deflection of the rear end of the tractor frame is resisted by vertical guides 9. A part of the lateral strain is transferred through the shafts to yokes 15 and through the yoke trunnions to longitudinal beam 4 and transverse beam 3 which are braced by the main frame. The vertical load on the tractor shafts and added strain caused by vertical tilting is transferred to longitudinal truss 12 at its ends and at the center through diagonal braces 16. Strains applied laterally to the front and rear drum ends tend also to twist the yokes 15 out of their transverse horizontal position. This twisting is resisted by brace arms 140 and their guides. Strains often occur which tend to move the tractor units outwardly away from the longitudinal axis of the machine. This occurs, for instance, when there is a ridge in the roadway, the sides of which are straddled by the drums of the respective tractor units. Such strains tend to move the yokes 15 partly outward, and are resisted by the inner trunnion bearings 24 engaging heads 27 of the trunnion bolt 25, as well as by the outer trunnion connection of the yokes with cross beam 2. Further analysis of the strains and stresses which are applied to the tractors will show that the arrangement provided takes care of all of them properly and distributes the strains to several parts of the tractor frames and their different connections with the main frame, and so to several parts of the main frame and thus undue strain on any one part is prevented.

End thrust on the driving shafts 18 caused mainly by the driving reaction is taken up by the thrust bearings 17$^b$, 20$^b$, and distributed to the ends 13, 14, of longitudinal truss 12 and to yokes 15 and from the yokes is transferred to the main frame through the trunnions and cross beam 2.

Figures 3 and 4 show most clearly that the arrangement of frame and driving parts provides a wide and high longitudinal clearance space throughout the length of the machine between the tractor drums. The upper limit of this space is substantially defined by the under sides of beam 4, cross braces 11 and 10, and yokes 15. The lower stretches of drive chains 59 pass outside of the limits of this longitudinal clearance space, as clearly shown in Figure 4. Even when the tractor drums sink deep into soft snow, the central ridge between the channels formed by the drums is accommodated in this clear space without any parts of the frame dragging on the snow surface, except in the most exceptional cases.

What I claim is:

1. In a snow motor vehicle, a main frame carrying a motor, change speed gearing and control devices, a tractor comprising two substantially conoidal drums of large diameter and sufficient length to support the drums and the vehicle properly in soft deep snow, the drums being in axial alinement with their larger ends adjacent, one of the drums having a large part of its surface extending away from the smaller end smooth, a large remaining part of its surface being provided with helical driving ribs, a shaft rotatably supporting the drums, an oscillatable connection between the tractor and the main frame, and a driving connection between the change speed gearing and the drum shaft.

2. In a snow motor vehicle, a main frame carrying a motor, change speed gearing and control devices, a tractor comprising two substantially conoidal drums of large diameter and sufficient length to support the drums and the vehicle properly in soft deep snow, the drums being in axial alinement with their larger ends adjacent, one of the drums having a large part of its surface extending away from the smaller end smooth, a large remaining part of its surface being provided with helical driving ribs, the surfaces of the drums approaching their adjacent ends being rounded inward relatively sharply, a shaft rotatably supporting the drums, an oscillatable connection between the drum structure and the main frame, and a driving connection between the change speed gearing on the main frame and the drum shaft.

3. In a snow motor vehicle, a main frame carrying a motor, change speed gearing and control devices, a tractor comprising two substantially conoidal drums of large diameter and sufficient length to support the drums and the vehicle properly in soft deep snow, the drums being in axial alinement with their larger ends adjacent, one of the drums having a large part of its surface extending away from the smaller end smooth, a large remaining part of its surface being provided with a plurality of shallow helical driving ribs, a shaft rotatably supporting the drums, an oscillatable connection between the tractor and the main frame, and a driving connection between the change speed gearing and the drum shaft.

4. In a snow motor vehicle, a main frame carrying a motor, change speed gearing and control devices, a tractor comprising two substantially conoidal drums of large diameter and sufficient length to support the drums and the vehicle properly in soft deep snow, the drums being in axial alinement with their larger ends adjacent, one of the drums having a large part of its surface extending away from the smaller end smooth, a large remaining part of its surface being provided with a plurality of shallow helical driving ribs, the surfaces of the drums approaching their adjacent ends being rounded inward relatively sharply, a shaft rotatably supporting the drums, an oscillatable connection between the drum structure and the main frame, and a driving connection between the change speed gearing on the main frame and the drum shaft.

5. In a snow motor vehicle, a main frame carrying a motor, driving mechanism and controlling devices, and a tractor structure oscillatably connected to the main frame and including a rotatable shaft, two separated conoidal tractor drums mounted on the shaft, with the larger ends of the drums adjacent, each drum having a large smooth surface extending from its smaller end toward the other end, each drum having a zone provided with helical driving ribs arranged with a steep pitch angle, the adjacent ends of the drums having an accentuated inward curvature; and a driving connection between the drum shaft and the driving mechanism on the main frame.

6. In a snow motor vehicle, a main frame carrying a motor, clutch and transmission mechanism, a tractor frame oscillatably connected to the main frame, a drive shaft in the tractor frame, two separated conoidal tractor drums on the shaft with their larger ends adjacent, each drum having an extensive smooth surface adjacent to its smaller end and an extensive surface adjacent to its larger end provided with helical driving ribs, and a driving element on the shaft between the drums, and transmission mechanism connecting said driving element with the transmission mechanism on the main frame.

7. In a snow motor vehicle, a main frame carrying a motor and transmission mechanism, a tractor frame oscillatably connected to the main frame on a transverse horizontal axis at a point substantially near the longitudinal center of the tractor frame, a shaft rotatably mounted in the tractor frame, two spaced tractor drums on the shaft, the drums having peripheral surfaces convexly curved longitudinally, a large part of the surface of one of the drums being smooth and another part of its surface being provided with helical driving ribs, the drums being of relatively large diameter and length sufficient to support them and the vehicle in soft deep snow, a driving member on the shaft between the drums approximately in line with the oscillating axis of the tractor frame, and a driving connection between said member and the main frame transmission mechanism, adapted to conform to the relative movement of the tractor frame and main frame.

8. In a snow motor vehicle, a main frame carrying a motor and control devices, a tractor frame connected to oscillate vertically at a point substantially near its center to the main frame, a shaft rotatably mounted in the tractor frame, conoidal tractor drums on said shaft of sufficient diameter and length to support them and the vehicle in soft deep snow, one of the drums having a smooth surface extending from its smaller end approximately to a point where the longitudinal lower surface of the drum is approximately parallel to the normal snow surface, a large part of the length of the drum surface rearward of the smooth surface being provided with a plurality of shallow helical driving ribs, the other drum having its surface for a considerable length provided with a plurality of similar driving ribs, means for guiding the tractor frame in its oscillating movement and preventing lateral deflection of said frame, and a driving connection between said shaft and the motor.

9. In a snow motor vehicle, a drum shaft, a pair of spaced conoidal tractor drums on the shaft, one of the drums having a large smooth surface near its smaller end and a large surface provided with a plurality of helical driving ribs, means for bracing the shaft in vertical and horizontal planes, a main frame, an oscillating connection between the main frame and the tractor shaft, and means for guiding the oscillation of the tractor shaft and drums relative to the main frame and preventing lateral deflection of the tractor shaft.

10. In a snow motor vehicle, a main frame, a motor and speed-change and controlling mechanism thereon, a tractor structure comprising a longitudinal truss, a transverse yoke having bearings for an intermediate portion of the shaft, a vertical brace connecting the yoke and truss, a tractor drum of large diameter on the shaft between the yoke and one end of the truss, said drum having an extensive curved smooth peripheral surface and an extensive peripheral surface provided with helical driving ribs, another tractor drum of large diameter on the shaft between the yoke and the other end of the truss, and having an extensive surface provided with a plurality of shallow helical driving ribs, a drive member on the shaft within said yoke, a second drive member carried by the yoke near its inner end, a driving connection between the two members, means for adjusting the second drive member toward and from the shaft, means carried by the main frame providing an oscillating support for said yoke in a transverse horizontal axis of the vehicle, guide means intermediate the main frame and the ends of the tractor structure to guide the latter in its vertical oscillations and prevent lateral deflection, and a driving connection between the second drive member and the speed-change mechanism on the main frame, including means to accommodate the oscillating movement of the yoke.

11. In a snow motor vehicle, a main frame, two tractor frames movably connected to the main frame, one at each side, a conoidal tractor drum located in each tractor frame and having a smooth surface extending from the smaller end a considerable distance toward the larger end and a plurality of shallow helical driving ribs arranged on the drum surface between the smooth portion and the larger end of the drum, the drum being of sufficient diameter and length to support the vehicle in deep, soft snow, and means for rotating the drum.

12. In a snow motor vehicle, a main frame carrying a motor and power transmission mechanism, two tractor frames oscillatably connected to the main frame, one at each side, a tractor drum rotatably mounted in each tractor frame, the drum having a smaller and a larger end and its surface being convexly curved from the smaller end to a point near the larger end, the surface being smooth from the smaller end for a considerable distance toward the larger end, the surface from that point substantially to the larger end being provided with a plurality of helical driving ribs, the drum being of sufficient diameter and length to support itself and the vehicle in deep soft snow, and driving connections between the tractor drums and the transmission mechanism on the main frame.

13. In a snow motor vehicle, a main frame carrying a motor, change-speed gearing and control devices, two tractors, one located at each side of the main frame and each comprising two substantially conoidal drums of large diameter and sufficient length to support the drums and the vehicle properly in soft deep snow, the drums being in axial alinement with their larger ends adjacent, one of the drums having a large part of its surface extending away from the smaller end smooth, a large remaining part of its surface being provided with a plurality of shallow helical driving ribs, a shaft rotatably supporting the drums and an oscillatable connection between the tractor and the main frame, and driving connections between the change-speed gearing and the drum shafts.

14. In a snow motor vehicle, a main frame carrying a motor, change-speed gearing and control devices, two tractors, each comprising two substantially conoidal drums of large diameter and sufficient length to support the drums and the vehicle properly in soft deep snow, the drums being in axial alinement with their larger ends adjacent, one of the drums having a large part of its surface extending away from the smaller end smooth, a large remaining part of its surface being provided with a plurality of helical driving ribs, the surfaces of the drums approaching their adjacent ends being rounded inwardly relatively sharply, a shaft rotatably supporting the drums and an oscillatable connection between the drum structure and the main frame and driving connections between the change-speed gearing and the drum shaft.

15. In a snow motor vehicle, a main frame carrying a motor, driving mechanism and controlling devices, two tractor structures oscillatably connected to the main frame, one at each side of the main frame, and including a rotatable shaft, two separated conoidal tractor drums mounted on the shaft, with the larger ends of the drums adjacent, each drum having a large smooth surface extending from its smaller end toward the other end, each drum having a zone provided with a plurality of helical driving ribs arranged with a steep pitch angle, the adjacent ends of the drums having an accentuated inward curvature, and driving connections between the drum shafts and the driving mechanism on the main frame.

16. In a snow motor vehicle, a main frame carrying a motor, clutch and transmission mechanism, two tractor frames oscillatably connected to the main frame, one at each side of the main frame, each tractor frame comprising a drive shaft, two separated conoidal tractor drums on the shaft with their larger ends adjacent, each drum having an extensive smooth surface adjacent to its smaller end and an extensive surface adjacent to its larger end provided with a plurality of helical driving ribs, a driving element on the shaft between the drums, and transmission mechanism connecting said driving elements with the transmission mechanism on the main frame.

17. In a snow motor vehicle, a main frame carrying a motor and transmission mechanism, two tractor frames located at opposite sides of the main frame and each oscillatably connected to the main frame on a transverse horizontal axis at a point substantially near the longitudinal center of the tractor frame, a shaft rotatably mounted in each tractor frame, two spaced tractor drums on each shaft, the drums having peripheral surfaces convexly curved longitudinally, a large part of the surface of one of the drums being smooth and another part of its surface being provided with a plurality of helical driving ribs, the drums being of relatively large diameter and length sufficient to support them and the vehicle in soft, deep snow, a driving member on each shaft between the drums approximately in line with the oscillating axis of the tractor frame, and driving connections between said driving members and the main frame, and transmission mechanism adapted to conform to the relative movement of the tractor frame and main frame.

18. In a snow motor vehicle, a main frame, carrying a motor and control devices, two tractor frames, one at each side of the main frame and connected to oscillate vertically at a point substantially near its center to the main frame, a shaft rotatably mounted in each tractor frame, spaced conoidal drums on each shaft of sufficient diameter and length to support them and the vehicle in deep, soft snow, one of the drums on each shaft having a smooth periphery extending from its smaller end to about the middle of the drum, and having its surface extending from that point to a point near the larger end of the drum provided with a plurality of helical driving ribs, the other drum on each shaft having its surface provided with a plurality of similar driving ribs, means for guiding the tractor frames in their oscillating movement and preventing lateral deflection of the frames, and driving connections between said shafts and the motor.

19. In a snow motor vehicle, a pair of parallel drum shafts, a pair of spaced conoidal tractor drums on each shaft, one of the drums of each pair having a large smooth surface near its smaller end and a large surface provided with a plurality of shallow helical driving ribs, means for bracing each of the shafts in vertical and horizontal planes, a main frame located between and above the shafts, an oscillating connection between the main frame and each of the shafts, and means for guiding the oscillations of the tractor shafts and drums relative to the main frame and preventing lateral deflection of the tractor shafts.

20. In a snow motor vehicle, a main frame, a motor, change speed gearing and control devices located thereon, a tractor unit at each side of the main frame, each tractor unit comprising a frame, a longitudinal shaft mounted in bearings in the frame, two tractor drums located on the shaft and spaced apart from each other, the general longitudinal contour of the drums being a curve presenting a considerably upwardly-inclined angle to the snow surface at the front end of the forward drum and at the rear end of the rear drum, approximately half of the forward surface of the forward drum being smooth and a principal part of the remaining surface of the drum being provided with helical driving ribs, a considerable part of the rearward surface of the rear drum being smooth and a large part of the remaining surface of the drum being provided with a plurality of shallow helical driving ribs, the peripheral surfaces of the adjacent ends of the two drums being curved inward toward the shaft to present a curvedly-inclined surface to the snow surface in either direction of movement of the vehicle, a driving member on each shaft between the drums, a transverse member forming part of the tractor frame and connected oscillatably in a transverse horizontal axis with the main frame, the oscillation axes of the two tractor frames being substantially coincident, a second driving member located near the inner end of each of said transverse members, said second driving members being each connected to the first mentioned driving member of its tractor unit, a gear casing near the rear end of the main frame, transmission gearing therein, a flexible driving connection from a part of said gearing to one of said second driving members, a flexible driving connection from another part of said gearing to the other of said second driving members, and a driving connection from said change-speed gearing to a part of the transmission gearing in said rear gear casing.

21. In a snow motor vehicle, a main frame having a forward extension, a tractor frame at each side of the main frame and flexibly connected to it, a tractor drum in each tractor frame of large diameter and sufficient length to support the vehicle in soft, deep snow, the tractor drums having surfaces convexly curved longitudinally, a large part of the peripheral surface of each drum being smooth and a large part of the remaining surface of each drum being provided with a plurality of helical driving ribs, means for driving the drums, a steering runner and a connection between the runner and said forward extension of the main frame, said connection including means by which the runner may be deflected laterally for steering and means by which the runner may oscillate in a vertical plane in passing over irregular surfaces, steering mechanism on the main frame and a connection between said steering mechanism and the runner for effecting its steering movement.

22. In a snow motor vehicle, a main frame having a forward extension, tractor drums supporting the main frame, means for driving the drums, a steering cross beam pivotally connected at its center to said main frame extension to oscillate in a transverse vertical plane, a substantially upright steering spindle mounted in a bearing at each end of said cross beam, a steering runner pivotally connected to the lower end of each spindle to oscillate vertically, spring means to regulate the vertical oscillation of the runners, a steering arm connected to each steering spindle, a cross link connecting the arms, another steering arm connected to one of the spindles, a steering gear on the main frame, and a connection from said steering gear to the steering arm last mentioned.

23. In a snow motor vehicle, a main frame having a forward extension, tractor drums supporting the main frame, means for driving the drums, a steering cross beam pivotally connected at its center to said main frame extension to oscillate in a transverse vertical plane, a steering spindle mounted in a bearing at each end of said cross beam, a steering runner pivotally connected to the lower end of each spindle to oscillate vertically, spring means to regulate the vertical oscillation of the runners, a steering arm connected to each steering spindle, a cross link connecting the arms, another steering arm connected to one of the spindles, a steering gear on the main frame, and a connection from said steering gear to the steering arm last mentioned, said steering connection including a lever fulcrumed on the main frame, a drag link connecting the steering gear with said lever and another drag link connecting said lever with said steering arm.

24. In a tractor drum for snow motor vehicles, a helical driving rib fixed to the drum surface and having a peripheral portion or head, and a relatively thin web between the head and drum surface.

25. In a tractor drum for snow motor vehicles, a shell of circular cross section provided with helical driving ribs, the cross sectional shape of each rib being characterized by a relatively thin web and an enlarged rounded head.

26. A tractor drum for snow motor vehicles, comprising a shaft, flanges thereon, a drum of approximately conoidal contour having its ends fixed to the flanges, and a multiplicity of helical driving ribs secured to a portion of the drum surface, leaving an extensive part of the drum surface smooth.

27. A tractor drum for snow motor vehicles, comprising a shaft, an approximately conoidal shell having its ends secured to the shaft, a plurality of shallow helical driving ribs secured to a portion of the shell surface and annular reinforcements within the shell.

28. A tractor drum for snow motor vehicles, comprising a shaft provided with flanges, an approximately conoidal shell, means securing the smaller end of the shell to one of the flanges, a plate secured to the other flange and in turn connected to the other end of the shell, and a plurality of helical driving ribs secured to a portion of the shell surface.

29. In a snow motor vehicle, a main frame including a longitudinal beam, and a cross beam located above the longitudinal beam, a tractor frame comprising a yoke pivotally connected to the longitudinal beam and the cross beam and lateral brace means for the yoke comprising brace members extending laterally from the yoke at each side of its pivot connection with the longitudinal beam, and guide means carried by the longitudinal beam engaging the brace members and guiding them in their oscillating movement while resisting lateral deflection of the yoke.

30. In a snow motor vehicle, the combination of a longitudinal frame member, a yoke pivotally connected to the frame member, brace arms extending from the yoke, one at each side adjacent to the above connection, and guides carried by the frame member and engaging the brace arms to permit oscillation of the yoke and resist lateral deflection thereof.

31. A snow motor vehicle including axially aligned propelling drums having snow-engaging surfaces principally located in a single longitudinally convex plane.

32. A snow motor vehicle comprising two axially alined tractor drums, the longitudinal contour of the drums being defined by a continuous curve extending substantially from the front end of one drum to the rear end of the other.

33. A snow motor vehicle comprising a drive shaft and two tractor drums thereon having their principal longitudinal surfaces defined by a continuous curved line extending from the front end of one drum to the rear end of the other.

34. A snow motor comprising a main frame, a motor, transmission mechanism, and a tractor unit comprising a longitudinal shaft, two tractor drums thereon having substantially continuously curved surfaces extending from the front end of one drum to the rear end of the other, and helically arranged driving ribs on the drums.

35. In a snow motor vehicle, a main frame, a motor and transmission mechanism and two longitudinal tractor shafts, one arranged at each side of the vehicle, and a pair of tractor drums on each shaft, the surfaces of each pair of drums being defined by a substantially continuous curve.

36. In a snow motor vehicle, a main frame, a motor and transmission mechanism thereon, and longitudinal tractor frames, one pivotally connected at each side of the main frame, each tractor frame carrying a longitudinal shaft and a pair of tractor drums thereon, the surfaces of each pair of drums describing a substantially continuous curve to support the machine on irregular surfaces by pivotal movement of the tractor frames and simultaneous engagement of a part of the surface of each drum of each pair with the snow surface.

37. In a snow motor vehicle, two pairs of parallel alined tractor drums having the surfaces of the drums of each pair defined by a continuous curved line extending from end to end of the pair of drums.

38. In a snow motor vehicle, a pair of parallel drum shafts, one arranged at each side of the vehicle, a pair of spaced conoidal tractor drums on each shaft, one of the drums of each pair having a smooth surface extending from its smaller end for a considerable distance toward its other end, and a large surface between said smooth portion and the other end of the drum provided with a plurality of separate helical driving ribs, a main frame, an oscillating connection between the main frame and each of said shafts, and means for guiding the oscillations of the tractor drums relative to the main frame to prevent lateral deflection thereof, the drums being of sufficient diameter and length to support the vehicle in deep soft snow.

39. In a snow motor vehicle, a pair of parallel drum shafts, one arranged at each side of the vehicle, a pair of spaced conoidal tractor drums on each shaft, one of the drums of each pair having a smooth surface extending from its smaller end for a considerable distance toward its other end, and a large surface between said smooth portion and the other end of the drum provided with a plurality of separate helical driving ribs, a longitudinal truss member spanning each pair of drums, a main frame, an oscillating connection between the main frame and each of said shafts, and means for guiding the oscillations of the tractor drums relative to the main frame to prevent lateral deflection thereof, the drums being of sufficient diameter and length to support the vehicle in deep soft snow.

40. In a snow motor vehicle, a pair of parallel drum shafts, one arranged at each side of the vehicle, a pair of spaced conoidal tractor drums on each shaft, one of the drums of each pair having a smooth surface extending from its smaller end for a considerable distance toward its other end and a large surface between said smooth portion and the other end of the drum provided with a plurality of separate helical driving ribs, the forward drums of each pair being located substantially beneath the front portion of the vehicle and the rear drums of each pair being located substantially beneath the rear portion of the vehicle, a main frame, an oscillating connection between the main frame and each of said shafts, and means for guiding the oscillations of the tractor drums relative to the main frame to prevent lateral deflection thereof, the drums being of sufficient diameter and length to support the vehicle in deep soft snow.

41. In a snow motor vehicle, a pair of parallel drum shafts, one arranged at each side of the vehicle, a pair of spaced conoidal tractor drums on each shaft, the forward drum of each pair having a smooth surface extending from its forward end for a considerable distance toward its rear end, and a large surface between said smooth portion and the rear end of the drum provided with a plurality of separate helical driving ribs, and the rear drum of each pair having a smooth surface extending from its rear end for a considerable distance toward the forward end, and a large surface between said smooth portion and the forward end of the drum provided with a plurality of separate helical driving ribs, a main frame, an oscillating connection between the main frame and each of said shafts, and means for guiding the oscillations of the tractor drums relative to the main frame to prevent lateral deflection thereof, the drums being of sufficient diameter and length to support the vehicle in deep soft snow.

42. In a snow motor vehicle, a pair of parallel drums shafts, one arranged at each side of the vehicle, a pair of spaced conoidal tractor drums on each shaft, the forward drum of each pair having a smooth surface extending from its forward end for a considerable distance toward its rear end, and a large surface between said smooth portion and the rear end of the drum provided with a plurality of separate helical driving ribs, and the rear drum of each pair having a smooth surface extending from its rear end for a considerable distance toward the forward end, and a large surface between said smooth portion and the forward end of the drum provided with a plurality of separate helical driving ribs, a longitudinal truss member spanning each pair of drums, a main frame, an oscillating connection between the main frame and each of said shafts, and means for guiding the oscillations of the tractor drums relative to the main frame to prevent lateral deflection thereof, the drums being of sufficient diameter and length to support the vehicle in deep soft snow.

43. A snow motor vehicle comprising a main frame, a tractor shaft, a tractor drum thereon, a curved longitudinal tractor frame member carrying at its ends bearings for the shaft, and a pivotal connection between the longitudinal member and the main frame.

44. A snow motor vehicle comprising a main frame, a longitudinal tractor shaft, tractor drums thereon having curved longitudinal surfaces, a longitudinal tractor frame member substantially continuously curved with its main upper portion approximately parallel to the upper drum surfaces, bearings for the shaft carried at the ends of the longitudinal member, and a pivotal connection between the longitudinal member and the main frame.

45. A snow motor vehicle comprising a main frame, a longitudinal tractor shaft, tractor drums thereon having curved longitudinal surfaces, a longitudinal tractor frame member substantially continuously curved with its main upper portion approximately parallel to the upper drum surfaces, bearings for the shaft carried at the ends of the longitudinal member, a transverse tractor frame member between the tractor drums, vertical bracing connecting the transverse member to the longitudinal member, and pivotal connections between the ends of the transverse member and the main frame.

46. A snow motor vehicle comprising a main frame, a tractor frame including a longitudinal truss, and a transverse member connected to the truss by vertical bracing, a shaft supported by bearings in the ends of the longitudinal member and in the transverse member, tractor drums on the shaft, and pivotal connections between elements of the main frame and the inner and outer ends of the transverse tractor frame member.

47. A snow motor vehicle comprising a main frame, a tractor frame including a longitudinal truss, a transverse member connected to the truss by vertical bracing, a shaft supported by bearings in the ends of the longitudinal member and in the transverse member, and tractor drums on the shaft, and pivotal connections between elements of the main frame and the inner and outer ends of the transverse tractor frame member, the inner pivotal connection including means to prevent outward displacement of said transverse member.

48. A snow motor vehicle comprising a main frame, a tractor frame including a longitudinal member and a transverse member, a pivotal connection between the outer end of the transverse member and the main frame, and a pivotal connection between the inner end of the transverse member and the main frame, said connection including a headed element arranged to prevent outward displacement of the transverse member.

49. A snow motor vehicle comprising a main frame, rotary tractor drums mounted on longitudinal axes, one at each side of the vehicle, the drums having smooth end portions and other portions provided with helical driving ribs, and being large enough to support the vehicle in deep, soft snow, a pivotal connection with the main frame near one end of each drum structure, means near the other end of each drum structure for guiding the drum in vertical movement, and means for driving the drums.

50. In a snow motor vehicle, a main frame, a motor and transmission mechanism thereon, a longitudinal tractor shaft rotatably supported near each side of the main frame, a tractor drum on each shaft, of adequate size to support the vehicle in deep, soft snow, the drums being approximately conical and having smooth end portions and other areas of substantial length provided with helical driving ribs, means supporting each shaft oscillatably in relation to the main frame near one end of its drum, means near the other end of the drum for guiding the shaft in vertical oscillating movement, and a driving connection to each shaft arranged to admit of the oscillating movement.

Signed at Indianapolis, in the county of Marion and State of Indiana, this 20th day of November, A. D. 1920.

FREDERICK R. BURCH.